(12) United States Patent
Cuypers et al.

(10) Patent No.: US 8,205,380 B2
(45) Date of Patent: Jun. 26, 2012

(54) METHOD OF GROWING PLANTS

(75) Inventors: Jean Marie Wilhelmus Cuypers, Linne (NL); Daan De Kubber, Roermond (NL); Paul Bouwens, Vught (NL)

(73) Assignee: Rockwool International A/S (DK)

( * ) Notice: Subject to any disclaimer, the term of this patent is extended or adjusted under 35 U.S.C. 154(b) by 512 days.

(21) Appl. No.: 12/374,330

(22) PCT Filed: Jul. 20, 2007

(86) PCT No.: PCT/EP2007/006475
§ 371 (c)(1),
(2), (4) Date: Jun. 23, 2009

(87) PCT Pub. No.: WO2008/009463
PCT Pub. Date: Jan. 24, 2008

(65) Prior Publication Data
US 2009/0300981 A1    Dec. 10, 2009

(30) Foreign Application Priority Data

Jul. 20, 2006   (EP) .................................. 06253804

(51) Int. Cl.
*A01G 9/10* (2006.01)
(52) U.S. Cl. ........................................ 47/59 S
(58) Field of Classification Search ................. 47/59 S, 47/63, 64
See application file for complete search history.

(56) References Cited

U.S. PATENT DOCUMENTS

| | | | | |
|---|---|---|---|---|
| 2,891,354 A * | 6/1959 | Smithers | ........................ | 47/41.12 |
| 2,922,254 A * | 1/1960 | Smithers | ........................ | 47/41.12 |
| 3,336,129 A | 8/1967 | Herrett et al. | | |
| 4,058,931 A * | 11/1977 | Vestergaard | ........................ | 47/87 |
| 4,174,957 A * | 11/1979 | Webb et al. | ........................ | 71/24 |
| 4,240,817 A | 12/1980 | Takizawa et al. | | |
| 4,769,277 A | 9/1988 | Meunier | | |
| 4,780,988 A * | 11/1988 | Mielke et al. | ............... | 47/58.1 R |
| 4,803,803 A * | 2/1989 | Moffet, Jr. | ........................ | 47/59 R |
| 5,009,030 A | 4/1991 | Kafka et al. | | |
| 5,584,140 A * | 12/1996 | Byrne | ........................ | 47/58.1 R |
| 5,888,803 A * | 3/1999 | Starkey | ........................ | 435/254.1 |
| 6,238,685 B1 * | 5/2001 | Hei et al. | ........................ | 424/405 |
| 8,020,344 B2 * | 9/2011 | Cuypers et al. | ............. | 47/58.1 R |
| 2003/0089152 A1 * | 5/2003 | Yelanich et al. | ..................... | 71/23 |
| 2009/0300981 A1 * | 12/2009 | Wilhelmus Cuypers et al. | ......................... | 47/58.1 R |

FOREIGN PATENT DOCUMENTS

| | | |
|---|---|---|
| CA | 2301248 | 9/2000 |
| DE | 4024727 | 2/1992 |
| DE | 4208733 | 9/1993 |
| EP | 0201426 | 12/1986 |
| EP | 310501 | 4/1989 |
| EP | 313255 | 4/1989 |
| EP | 0485277 | 5/1992 |
| EP | 889175 | 1/1999 |
| EP | 1226749 | 7/2002 |
| GB | 1336426 | 11/1973 |
| GB | 2079286 | 1/1982 |
| WO | WO8300797 | 3/1983 |
| WO | WO9204824 | 4/1992 |
| WO | WO9603858 | 2/1996 |
| WO | WO9700797 | 1/1997 |
| WO | WO9707664 | 3/1997 |
| WO | WO9938372 | 8/1999 |
| WO | WO 03041487 | 5/2003 |
| WO | WO2008009461 | 1/2008 |
| WO | WO 2008009462 | 1/2008 |
| WO | WO2008009463 | 1/2008 |
| WO | WO2008009467 | 1/2008 |

* cited by examiner

*Primary Examiner* — Frank T Palo
(74) *Attorney, Agent, or Firm* — McAndrews, Held & Malloy, Ltd.

(57) ABSTRACT

The invention provides a method of growing plants in a non-fibrous growth substrate, the method comprises providing at least one non-fibrous growth substrate comprising wetting agent, positioning one or more plants for growth in the growth substrate, characterized in that the wetting agent comprises ionic surfactant and the non-fibrous growth substrate is selected from the group consisting of urea formaldehyde foam, perlite, vermiculite, expanded clay, coco chips, coco dust, lava, pumice and mixtures thereof.

14 Claims, No Drawings

METHOD OF GROWING PLANTS

RELATED APPLICATION

This application is a 371 National Phase filing of International Patent Application Serial No. PCT/EP2007/006475 filed Jul. 20, 2007, which claims priority benefit of EP Patent Application Serial No. 06253804.6 filed Jul. 20, 2006. Both applications are incorporated herein by reference in their entirety.

CROSS-REFERENCE TO RELATED APPLICATIONS

Not applicable.

STATEMENT REGARDING FEDERAL SPONSORED RESEARCH OR DEVELOPMENT

Not applicable.

THE NAMES OF THE PARTIES TO A JOINT RESEARCH AGREEMENT

Not applicable.

INCORPORATED BY REFERENCE OF MATERIAL SUBMITTED ON A COMPACT DISC

Not applicable.

BACKGROUND OF THE INVENTION

The invention relates to growth substrates. The growth substrate comprises a wetting agent which provides water handling characteristics. The invention also relates to methods of growing plants using the growth substrate and to the use of specific types of wetting agent to provide particular characteristics to a growth substrate.

It has been well known for many years to grow plants in growth substrates formed from mineral wool, and from a variety of other materials including inorganics such as perlite, organics such as coconut based materials, and organic foam materials such as those sold under the trade names Oasis and Phytocell. Products which are to be used as growth substrates must have a capacity to take up and hold water, which is routinely supplied by an irrigation system to the growth substrate, and re-wetting properties. Accordingly, it has been proposed to include a wetting agent in products which are to be used as growth substrates.

Two examples of this are U.S. Pat. No. 4,174,957 and U.S. Pat. No. 4,240,817. Each of these describes application of a wetting agent to urea formaldehyde foam. In U.S. Pat. No. 4,174,957 the wetting agent is "alcohol or various phosphates such as those used in detergents" and Surfside 30 is given as an example. U.S. Pat. No. 4,240,817 describes the use of alkylene glycol (a non-ionic material).

The commercial field itself has generally followed this approach and when surfactant is used it is normally a non-ionic surfactant.

This approach has certain problems. The first is that the water handling capabilities of the substrate, although good, show room for improvement. Thus, it would be desirable to provide systems which show improved re-saturation properties (ability of the growth substrate to take up water a second time once it has been wetted and then dried), improved water distribution properties (ability of the growth substrate to hold water at a more uniform concentration throughout the height of the growth substrate rather than concentrating at the base), and water retention.

Additionally, one problem which tends to arise with the non-ionic surfactants which have conventionally been used is that they are, during irrigation of the growth substrate, gradually lost from the growth substrate rather than being retained in the growth substrate structure. This means that the wettability properties of the growth substrate gradually decrease over time. This can have an impact on, for instance, the re-saturation properties and also on the water handling properties of a substrate which has been in place for a considerable time, and thus on the performance of the plant and growing process.

In particular, it is a constant aim of the growth substrate industry to provide a growth substrate which has improved water distribution over its height. It is required to achieve a water to air ratio throughout the growth substrate which is as close as possible to optimum. Naturally, when a growth substrate is irrigated with water, there is a tendency for water concentration at the base to be higher, and often significantly higher, than water concentration in the top region, purely due to the influence of gravity.

Accordingly, it is still, despite the many years during which the industry has used synthetic materials as growth substrates, an aim to provide materials which exhibit excellent water distribution properties and water retention properties, and which maintain these properties over time, during use, and thus can exhibit excellent re-saturation properties. It is also desirable to achieve this in the context of a product which has good structural integrity and can be made in conventional manner.

EP-A-1226749 discloses a process for the production of water-absorbing fiber products, which can be used for growing plants. According to this process, during production of the fibers, material is applied to the fibers after formation and before collection, comprising binder, wetting agent and aliphatic polyol. The binder can be a conventional phenol-based resin. The polyol can preferably be ethylene glycol, propylene glycol or trimethylolpropane. The wetting agent can be selected from a long list including salts of higher fatty acids, alkyl or aralkyl sulfates or sulfonates, fatty alcohol sulfates, alkyl phosphates, fatty alcohol ethoxylates, alkyl phenol ethoxylates, fatty amine ethoxylates, fatty acid ethoxylates, alkyl ammonium compounds. Alkyl benzene sulfonate is said to be preferred. No reason is given for this preference in the context of the fiber products disclosed.

Other disclosures of growth substrate include EP-A-313255, which describes a plant growth medium formed from a solid porous medium comprising an open cell foamed homo- or co-polymer of monomers selected from olefins, unsaturated monocarboxylic acid esters and unsaturated monocarboxylic acids (or ionomer derivatives). This is said to overcome disadvantages with rockwool substrates and polyurethane foam substrates. It is mentioned that a wetting agent may be included which is preferably a non-ionic surfactant, and anionic surfactants are also mentioned.

U.S. Pat. No. 3,336,129 discloses a growth substrate which comprises a substrate which can be for instance soil, sand, peat moss or vermiculite, in admixture with a water-swellable capable of absorbing water. It is also mentioned that the product can contain a wetting agent which can be anionic, non-ionic or cationic.

WO03/041487 describes a product which is intended to give improved properties versus growth substrates such as peat moss. The solution involves coconut coir pith and it is generally discussed that other non-coir/non-peat materials may be present. Examples are composted yard waste, composted bark, composted manure, peat humus, composted agricultural waste, composted animal byproducts, treated sewage sludge, animal and/or vegetable-based landfill waste, vermiculite, perlite, glass beads, foamed plastics and mixtures thereof. There is also disclosure that a horticulturally acceptable surfactant maybe included in the growth substrate. The majority discussed are non-ionic and there is mention of an ionic surfactant. There is one example involving ionic surfactants and dry coconut coir pith. There is separate mention of growth media which can be used including peat moss, top soil, sphagnum peat, perlite, vermiculite and Styrofoam.

According to the disclosed technology the growth substrate can exhibit improved physical properties, for instance improved bending properties. This can apply whilst maintaining firmness properties.

The root development properties of the product can be improved. For instance, more roots can be generated. The finer roots can exhibit better branching. The root distribution can be better—for instance there can be more roots in the top layer.

This can apply even if the product appears wetter to the user.

According to the disclosed technology, in a first aspect we provide a method of growing plants in a synthetic growth substrate, the method comprising:

providing at least one non-fibrous growth substrate comprising wetting agent, positioning one or more plants for growth in the growth substrate, characterized in that the wetting agent comprises ionic surfactant and the non-fibrous growth substrate is selected from the group consisting of urea formaldehyde foam, perlite, vermiculite, expanded clay, coco chips, coco dust, lava, pumice and mixtures thereof.

The growth substrate itself is novel and so in a second aspect we provide a non-fibrous growth substrate comprising wetting agent. wherein the wetting agent comprises ionic surfactant and the non-fibrous growth substrate is selected from the group consisting of urea formaldehyde foam, perlite, vermiculite, expanded clay, coco chips, coco dust, lava, pumice and mixtures thereof.

We find that this particular combination of substrate and ionic surfactant, especially linear alkyl benzene sulfonate surfactant, provides a surprisingly effective combination of water handling properties. This combination of substrate and surfactant and its effectiveness is not recognized in any of the citations mentioned above.

Furthermore, the choice of ionic, especially anionic surfactant, especially linear alkyl benzene sulfonate (LAS), appears to lead to greatly reduced loss of wetting agent during irrigation and consequently minimizes foaming problems during the irrigation process. LAS also has the advantage of being aerobically biodegradable in water. Phytotoxicity is low.

As a result of this recognition of the beneficial properties of ionic surfactants in particular, we also provide, in a second aspect of the disclosed technology, the use of an ionic surfactant to improve the water distribution characteristics of a non-fibrous growth substrate. Improvement is shown in particular in comparison with growth substrates containing a conventional wetting agent such as a non-ionic surfactant. The improvement can be shown either by replacement of a conventional non-ionic wetting agent or by addition of the ionic surfactant to the growth substrate, but generally is shown by replacement of the conventional wetting agent.

The growth substrate is non-fibrous. It is usually either formed of foam or is particulate.

If it is foam, it is urea formaldehyde foam (sold as Oasis and Phytocell).

If it is a particulate material it can be inorganic. Examples of inorganic particulate materials are perlite, vermiculite, lava granules, expanded clay granules, pumice.

Organic particulate materials include coco chips, coco dust, and peat.

Usually either foam or particulate is used, but blends can be used, in particular if the foam is granulated before blending. Blends of different particulates can also be used.

Some fibrous material may be included but the growth substrate as a whole is non-fibrous, so amounts of any fibrous material should be below 20%, in particular below 10% (by weight of the substrate as a whole). Fibrous materials include mineral wool (although this is less preferred), wood fibers, coco fibers.

Preferably the growth substrate is particulate and is selected from the group consisting of perlite, vermiculite, expanded clay, coco chips, coco dust, lava, pumice and mixtures thereof. Preferably it is selected from perlite, expanded clay, coco chips, coco dust, lava and pumice and mixtures thereof. More preferably it is selected from expanded clay, lava, pumice and mixtures thereof.

The growth substrate is normally a soil substitute, so generally is a non-soil material. Soil and peat may be included in small amounts, e.g. below 20%, in particular below 10% (by weight of the growth substrate).

Density of the growth substrate in the consolidated form depends on the particular material used. Foam products preferably have density from 20 to 125 kg/m3. Clay products preferably have density for 300 to 700 kg/m3. Coco products preferably have density from 55 to 125 kg/m3. Lava products preferably have density from 50 to 300 kg/m3. Perlite products preferably have density from 40 to 175 kg/m3. Pumice products preferably have density from 300 to 500 kg/m3. Vermiculite products preferably have density from 30 to 100 kg/m3.

Generally, the density of the product can range from 10 to 600 kg/m3, preferably 30 to 200 kg/m3, preferably 30 to 100 kg/m3.

When the growth substrate comprises foam, it can also comprise binder if required to provide physical integrity. If used, it is usually an organic binder, which is generally heat-curable. In such a case the growth substrate is preferably a coherent matrix connected by cured binder. The disclosed technology is particularly valuable when the binder is an organic hydrophobic binder, and in particular when it is a conventional heat-curable (thermosetting), hydrophobic binder. This has the advantage of convenience and economy. Thus, the binder is preferably a phenol formaldehyde resin or urea formaldehyde resin, in particular phenol urea formaldehyde (PUF) resin.

The binder is generally present in the growth substrate in amounts of from 0.1 to 10% based on the substrate, usually 0.5 to 5%, most preferably 1.5 to 5%.

The growth substrate comprises a wetting agent which is an ionic surfactant.

Preferably it is an anionic surfactant. Suitable anionic surfactants include salts (including, for example, sodium, potassium, ammonium and substituted ammonium salts such as mono-, di- and triethanolamine salts) of the anionic sulfate, sulfonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulfate surfactants and anionic sulfonate surfactants, anionic carboxylate surfactants and anionic soap surfactants.

Particularly preferred are the anionic sulfonate surfactants such as linear and branched alkyl benzene sulfonates, alkyl ester sulfonates, primary or secondary alkylene sulfonates, olefin sulfonates, sulfonated polycarboxylic acids, alkyl glycerol sulfonates, fatty acyl glycerol sulfonates, fatty oleyl glycerol sulfonates and mixtures thereof.

Most preferably the anionic surfactant is a linear alkyl benzene sulfonate in which the alkyl chain has from 5 to 20 carbon atoms. The sodium salt is preferred. This type of surfactant provides particularly beneficial water distribution properties and also provides excellent re-saturation properties and does not lead to foaming problems in the irrigation water. Conventional non-ionic surfactants allow the growth substrate to take up water but its water retaining capacity is not as good as with the type of surfactant used in the disclosed technology.

Preferably the alkyl chain length is in the range 8 to 16, and more preferably at least 90% of the chains are in the range 10 to 13 and more preferably at least 90% (by weight) are in the range 10 to 12.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are examples of zwitterionic surfactants.

The ionic surfactant is present in the growth substrate in amounts preferably from 0.03 to 5% (by weight), based on growth substrate, more preferably 0.01 to 3%, in particular, 0.15 to 2%.

If binder is used, preferably the amount (by weight) of ionic surfactant based on the weight of binder (dry matter) is in the range 0.01 to 5%, preferably 0.5 to 4%.

It is preferred that there is substantially no other wetting agent than the ionic surfactant, and it is particularly preferred that there is substantially no other wetting agent than linear alkyl benzene sulfonate. Thus, levels of such other materials are preferably below 0.1% (by weight) in particular below 0.01%, based on the growth substrate.

If the growth substrate comprises foam, it may contain other types of conventional additives in addition to binder and wetting agent, for instance salts such as ammonium sulfate and adhesion promoters such as silanes.

In the method, plants are positioned in the synthetic growth substrate for growth. One plant, or more than one, may be positioned in a single block of growth substrate.

The method may be any method of growing plants in a mineral wool substrate. These applications include germination of seedlings, propagation of cuttings, growth of plants in containers, freely planted cultures and sucking beds.

In all cases, it is a particular benefit of the growth substrates defined that they can be re-used. Thus, in the disclosed technology it is also possible to position the plants in a block of growth substrate which has previously been used and wetted and allowed to dry out.

The growth substrate can be provided in the form of a coherent mass. The growth substrate may be in any integral form, for instance in the form of small blocks or plugs, larger blocks, or an extensive mat/slab. Other dimensions may be selected as convenient. The growth substrate can thus be a coherent matrix, which has been produced as such, but can be formed by granulating a slab of growth substrate material and consolidating the granulated material. Alternatively, it may be used as a flowable particulate or granular composition, which is given shape by being held in a container. Which form is used will depend on the type of material used for the growth substrate.

The mass of growth substrate may have a variety of height, width and length dimensions, as conventional.

During the method the plants are irrigated with water and nutrients, as is conventional. The use of ionic surfactant has the advantage that loss of the wetting agent to the irrigation water is minimal, allowing for a system in which there is essentially no anti foam material in the irrigation water.

In use we find that the growth substrate exhibits a particularly desirable distribution of water over height. This distribution can be determined by comparing the water content at the top of the substrate with the water content at the bottom of the substrate. Each of these values are usually expressed as percentages and the difference between them is preferably less than 40%, more preferably less than 35% and in particular less than 30%. This may even be a negative value, when the water content is greater at the top than at the bottom. It may be up to −10%.

The beneficial properties of the ionic surfactant allow the use of the growth substrate of the disclosed technology in specific ways to obtain particular advantages not achievable with conventional non-fibrous growth substrates.

Thus we also provide a method of growing plants in a growth substrate of the disclosed technology, the method comprising:

providing at least one growth substrate of the disclosed technology, positioning one or more plants for growth in the growth substrate, wherein the height of the growth substrate is at least 53 mm.

We find that this particular ionic surfactant, especially linear alkyl benzene sulfonate surfactant, provides a surprisingly effective combination of water handling properties.

Particular benefits are seen in water distribution properties. Water distribution properties are especially important when a growth substrate having relatively large height is used, because it is such materials which suffer most from problems of water concentrating in the lower regions of the substrate.

We also provide a method of growing at least 3 plants in growth substrate of the disclosed technology, the method comprising positioning the plants for growth in the growth substrate so that the roots of each plant are positioned in a growth region, and irrigating the plants with irrigation water over a period of at least three days, wherein during the irrigation period at least one water content parameter as measured in the growth regions surrounding the plant roots varies over the set of all growth regions by not more than 30%.

We find that the particular ionic surfactant, especially anionic surfactant, in particular linear alkyl benzene sulfonate surfactant (LAS), provides a surprisingly improved homogeneity of the growth substrate when used. In particular the homogeneity achieved is generally consistently better than with conventional non-ionic based wetting agent.

Thus, in the disclosed technology, inclusion in the growth substrate of ionic surfactant as the wetting agent contributes towards the ability of the substrate to result in homogeneity of water properties (including water retention, resaturation and hydraulic conductivity) within a single mass of growth substrate, between masses of growth substrate produced in a single batch, and between batches of growth substrate. Accordingly, growers can confidently apply plants to potentially huge areas of the same growth substrate and maintain, over that entire area, a very narrow range of water contents, using the same irrigation system, so that as many plants as possible are maintained at optimum water content and there is minimal wastage of irrigation water and additives.

We also provide a method of growing plants in a growth substrate of the disclosed technology, the method comprising:

providing at least one growth substrate of the disclosed technology, positioning one or more plants for growth in the growth substrate, wherein there are plants grown in the growth substrate for a growth period of at least 3 months.

Particular benefits are seen in resaturation properties and retention of wettability over time.

The resaturation properties mean that this growth substrate is especially beneficial in processes where the substrate must be dried out and rewetted. Thus, in a further aspect we provide a method of growing plants in a growth substrate of the disclosed technology, the method comprising:

providing at least one growth substrate of the disclosed technology, positioning one or more plants for growth in the growth substrate, wherein in the method there is a first growing period during which the growth substrate contains plants and contains water, and after this growing period there is at least one dry period of at least one week during which the substrate does not contain plants and is dry, and after this dry period there is at least one second growing period during which the substrate is rewetted and plants are positioned in it for growth.

Details of these preferred methods, when used with mineral wool growth substrates, are set out in our copending applications filed today under refs LAS01882WO, LAS01891WO and LAS01895WO.

According to the disclosed technology the growth substrate can exhibit improved physical properties, for instance improved bending properties. This can apply whilst maintaining firmness properties.

The root development properties of the product can be improved. For instance, more roots can be generated. The finer roots can exhibit better branching. The root distribution can be better—for instance there can be more roots in the top layer.

This can apply even if the product appears wetter to the user.

The invention claimed is:

1. A method of growing plants in a non-fibrous growth substrate, the method comprising:

providing at least one non-fibrous growth substrate selected from the group consisting of perlite, expanded clay, coco chips, coco dust, lava, pumice and mixtures thereof, the substrate further comprising a wetting agent comprising linear alkyl benzene sulfonate anionic surfactant, positioning one or more plants for growth in the growth substrate, and growing said one or more plants in the growth substrate.

2. A method according claim 1 in which the growth substrate comprises no wetting agent other than the ionic surfactant.

3. A method according to claim 1 in which the amount of ionic surfactant is 0.03 to 5%, preferably 0.1 to 3% by weight based on weight of the growth substrate.

4. A method according to claim 1 in which the plants are irrigated with irrigation water and the irrigation water contains no anti foam material.

5. A method according to claim 1 in which the growth substrate comprises particulate material selected from the group consisting of perlite, expanded clay, coco chips, coco dust, lava, pumice.

6. A method according to claim 1 in which the growth substrate is selected from the group consisting of perlite, vermiculite, expanded clay, lava and pumice.

7. A method according to claim 1 in which the growth substrate is selected from the group consisting of expanded clay, lava and pumice.

8. A method according to claim 1 in which the ionic surfactant is present in an amount effective to improve the water distribution characteristics of the non-fibrous growth substrate.

9. A non-fibrous growth substrate selected from the group consisting of expanded clay, lava, pumice and mixtures thereof, further comprising a wetting agent that is an ionic surfactant.

10. A growth substrate according to claim 9, in which the wetting agent comprises anionic surfactant.

11. A growth substrate according to claim 10 in which the wetting agent comprises linear alkyl benzene sulfonate anionic surfactant.

12. A growth substrate according to claim 9 in which the growth substrate comprises no wetting agent other than the ionic surfactant.

13. A method according to claim 9 in which the amount of ionic surfactant is 0.03 to 5% by weight based on weight of the growth substrate.

14. A method according to claim 9 in which the amount of ionic surfactant is 0.1 to 3% by weight based on weight of the growth substrate.

* * * * *